(12) United States Patent
Montgomery

(10) Patent No.: US 7,287,761 B2
(45) Date of Patent: Oct. 30, 2007

(54) METHOD AND AN ASSEMBLY FOR SELECTIVELY ADJUSTING THE HEIGHT AND LOAD CAPACITY OF A MOTORIZED ASSEMBLY AND A MOTORIZED ASSEMBLY INCORPORATING THE METHOD

(76) Inventor: Charles James Montgomery, 2570 #5 Cloverdale Ave., Concord, CA (US) 94518

( * ) Notice: Subject to any disclaimer, the term of this patent is extended or adjusted under 35 U.S.C. 154(b) by 47 days.

(21) Appl. No.: 11/007,854

(22) Filed: Dec. 9, 2004

(65) Prior Publication Data
US 2006/0124371 A1 Jun. 15, 2006

(51) Int. Cl.
*B60G 17/052* (2006.01)
(52) U.S. Cl. ............... 280/5.514; 280/6.157; 280/5.5
(58) Field of Classification Search ........ 280/293, 280/301, 5.514, 6.157
See application file for complete search history.

(56) References Cited

U.S. PATENT DOCUMENTS

| | | | | |
|---|---|---|---|---|
| 4,422,661 A | * | 12/1983 | Kawamura ................. 200/276 |
| 4,568,101 A | * | 2/1986 | Bleustein et al. ........... 180/227 |
| 4,695,074 A | * | 9/1987 | Kobayashi et al. ...... 280/6.157 |
| 4,709,934 A | * | 12/1987 | Suzuki et al. ............ 280/6.157 |
| 4,815,758 A | * | 3/1989 | Yoshida ................... 280/6.159 |
| 5,086,866 A | * | 2/1992 | Banjo et al. ............... 180/219 |
| 6,253,867 B1 | * | 7/2001 | Lillbacka .................... 180/193 |
| 6,668,960 B1 | * | 12/2003 | Parker ....................... 180/227 |
| 6,905,126 B1 | * | 6/2005 | Jurrens .................... 280/5.514 |

* cited by examiner

*Primary Examiner*—Lesley D. Morris
*Assistant Examiner*—Daniel Yeagley
(74) *Attorney, Agent, or Firm*—Brooks Kushman P.C.

(57) ABSTRACT

A motorized assembly 10 having a handlebar control switch assembly 56 which allows the height and load carrying capacity of the motorized assembly 10 to be quickly and easily modified without requiring a user 11 to remove their hands from the handlebar portion 20 of the motorized assembly 10.

6 Claims, 2 Drawing Sheets

METHOD AND AN ASSEMBLY FOR SELECTIVELY ADJUSTING THE HEIGHT AND LOAD CAPACITY OF A MOTORIZED ASSEMBLY AND A MOTORIZED ASSEMBLY INCORPORATING THE METHOD

FIELD OF THE INVENTION

The present invention generally relates to a method and an assembly for selectively adjusting the height and the load capacity of a motorized assembly and to a motorized assembly incorporating the method and, more particularly, to a method and an assembly for efficiently and safely adjusting the height and load capacity of a motorized assembly and to a motorcycle which incorporates this method.

BACKGROUND OF THE INVENTION

There exists a wide variety of motorized assemblies, such as, by way of example and without limitation, a motorcycle or a motor scooter. For purposes of this description and this Application, it should be appreciated that the term "motorized assembly" is meant to refer to any self-powered assembly which is adapted to carry or transport one or more individuals, and that the method by which the power is generated is immaterial to this Application and to the various inventions described and claimed herein. Thus, the present invention and the term "motorized assembly" is directed to any assembly which is adapted to transport these one or more individuals by the use of some sort of generated power (e.g., such as the power provided by an internal combustion engine or electrical assembly) and is meant to be as broadly construed as possible to cover any such assemblies.

Particularly, these motorized assemblies are "driven" or operated to perform some task, such as carrying or transporting groceries, as well as for pleasure. With regard to these activities, it is frequently desirable to selectively raise and lower the assemblies in order to increase their respective load carrying capacities and to simply increase the overall riding pleasure.

Accordingly, there exists a variety of assemblies which selectively increase the height and load capacity of a motorized assembly. While these adjustment assemblies do allow the load carrying capacity and the height of a motorized assembly to be adjusted they suffer from some drawbacks. For example and without limitation, these assemblies undesirably require a relatively large amount of time to raise and lower the motorized assembly, they are complicated and not easily installed, they require a relatively large amount of effort to use and even require removal of at least one of the hands of the operator from the handlebar portion of the motorized vehicle, they may be used at any speed, including relatively fast speeds, thereby allowing an operator to be placed in a potentially dangerous condition, they require a relatively large amount of mounting space and must typically be unaesthetically placed on the side of the motorized assembly, and they have no respective "self-shut off" portion which prevents damage due to an undesired and continual running of the respective adjustment assemblies.

There is therefore a need for a new and improved adjustment assembly which overcomes these and other drawbacks and deficiencies of existing adjustment assemblies in a new and novel fashion and the present inventions singularly and cooperatively provide such a new and improved assembly.

SUMMARY OF THE INVENTION

It is a first non-limiting object of the present invention to provide a method and an assembly which overcomes some or all of the previously delineated drawbacks associated with current motorized assembly adjustment methods and assemblies.

It is a second non-limiting object of the present invention to provide a method and an assembly which overcomes some or all of the previously delineated drawbacks associated with current motorized assembly height and load carrying adjustment methods and assemblies and which, by way of example and without limitation, is relatively easy to install in an overall aesthetically pleasing manner.

It is a third non-limiting object of the present invention to provide a method and an assembly which overcomes some or all of the previously delineated drawbacks associated with current motorized assembly height and load carrying adjustment methods and assemblies and which, by way of example and without limitation, may be used only when the assembly is operated at a speed which is below some predetermined maximum threshold speed.

It is a fourth non-limiting object of the present invention to provide a method and an assembly which overcomes some or all of the previously delineated drawbacks associated with current motorized assembly height and load carrying adjustment methods and assemblies and which, by way of example and without limitation, is automatically deactivated after a certain predetermined period of time in order preserve the integrity of the overall assembly.

It is a fifth non-limiting object of the present invention to provide a method and an assembly which overcomes some or all of the previously delineated drawbacks associated with current motorized assembly height and load carrying adjustment methods and assemblies and which, by way of example and without limitation, may be selectively operated without removal of the hands of the operator from the handlebar portion of the motorized assembly.

According to one non-limiting aspect of the present invention, a motorized assembly is provided and includes a handlebar portion; a first portion which selectively adjusts the height of the motorized assembly; and a second portion which is operatively mounted upon the handlebar portion and which causes the first portion to selectively adjust the height of the motorized assembly.

According to a second non-limiting aspect of the present invention, a motorized assembly is provided and includes a first portion which adjusts the height of the motorized assembly; and a second portion which is coupled to the first portion and which allows the first portion to adjust the height only if the motorized assembly is operating below a certain allowable speed.

According to a third non-limiting aspect of the present invention, a motorized assembly is provided and includes a portion which becomes selectively activated and adjusts the height of the motorized assembly; and a second portion which automatically deactivates the portion after a certain predetermined period of time.

According to a fourth non-limiting aspect of the present invention, a motorized assembly is provided and includes a portion which allows the height of the motorized assembly to be raised in about two seconds.

According to a fifth non-limiting aspect of the present invention, a method for raising and lowering the height of a motorized assembly of the type having at least one air shock absorber is provided. Particularly, the said method includes the steps of providing a compressor; providing a tank; communicatively coupling the tank to the compressor; causing the compressor to communicate air to the tank; and causing at least a portion of the air to be selectively communicated from the tank to the air shock absorber, effective to raise the height of the motorized assembly.

According to a sixth non-limiting aspect of the present invention, an assembly is provided to selectively adjust the height and load carrying capacity of a motorized assembly by use of a handlebar switch.

These and other features, aspects, and objects of the present invention will become apparent from a reading of the detailed description of the preferred embodiment of the invention, including the subjoined claims, and by reference to the following drawings.

DETAILED DESCRIPTION OF THE PREFERRED EMBODIMENT OF THE INVENTION

Figure 1:
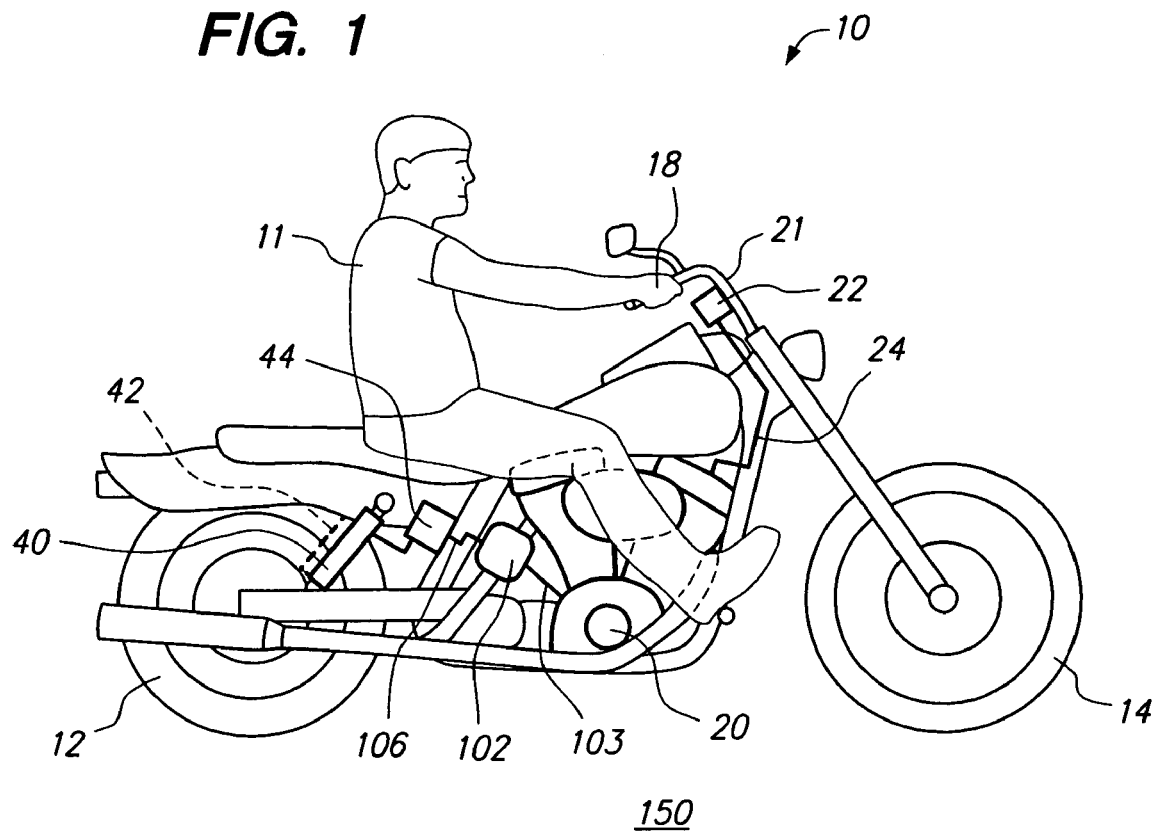
FIG. 1 is a side view of a motorized assembly incorporating the various inventions of the preferred embodiment of the invention, wherein the various inventions of the preferred embodiment of the invention are expressed in a block diagram fashion.

Referring now to FIG. 1, there is shown a motorized assembly 10 which is made in accordance with the teachings of the preferred embodiment of the invention. Particularly, as earlier stated, the motorized assembly 10 may comprise substantially any type of motorized assembly, including but not limited to a motorcycle and that nothing in this description is meant to limit the generality of the invention to only the motorized assembly which is shown in FIG. 1.

As shown, the motorized assembly 10 includes several wheels, such as 12 and 14, and a power or torque generation assembly 20 which may comprise an internal combustion type of engine and which is operatively coupled to each of the several wheels 12-14 and which is effective to provide propulsion type power, energy, or torque to the several wheels 12-14, effective to allow the motorized assembly 10 to be selectively operated or "driven". Further, the motorized assembly 10 includes a handlebar portion 21 which includes a control portion 22 which is physically and communicatively coupled to the power generation assembly 20, by the use of bus 24, effective to allow a rider or user 11 to control the operation of the power generation assembly 20 by use of the control portion 22 which is operatively resident upon the handlebar portion 21 (e.g., the hand 18 of the user 11 is used to steer and control the motorized assembly 10 and may also be used, without removal from handlebar portion 21, to control the power or torque generation assembly 20 by use of control 22). Such control may include activating or deactivating the power generation assembly 20. The motorized assembly 10 also includes an air shock assembly 45 (see FIG. 2) including a pair of air shock absorbers or air springs 40, 42 and a height adjustment and load carrying capacity adjustment portion 44 which is operatively and communicatively coupled to the pair of air shock absorbers 40, 42. It should be appreciated that different types of air shock assemblies may be used and that nothing in this description should limit the inventions to a particular type of air shock assembly or air spring assembly. Motorized assembly 10 also typically includes a battery or electrical energy storage device 102 which supplies power to various portions of the motorized assembly 10 by the bus 106 and which is coupled to the generation portion 20 by bus 103.

Figure 2:
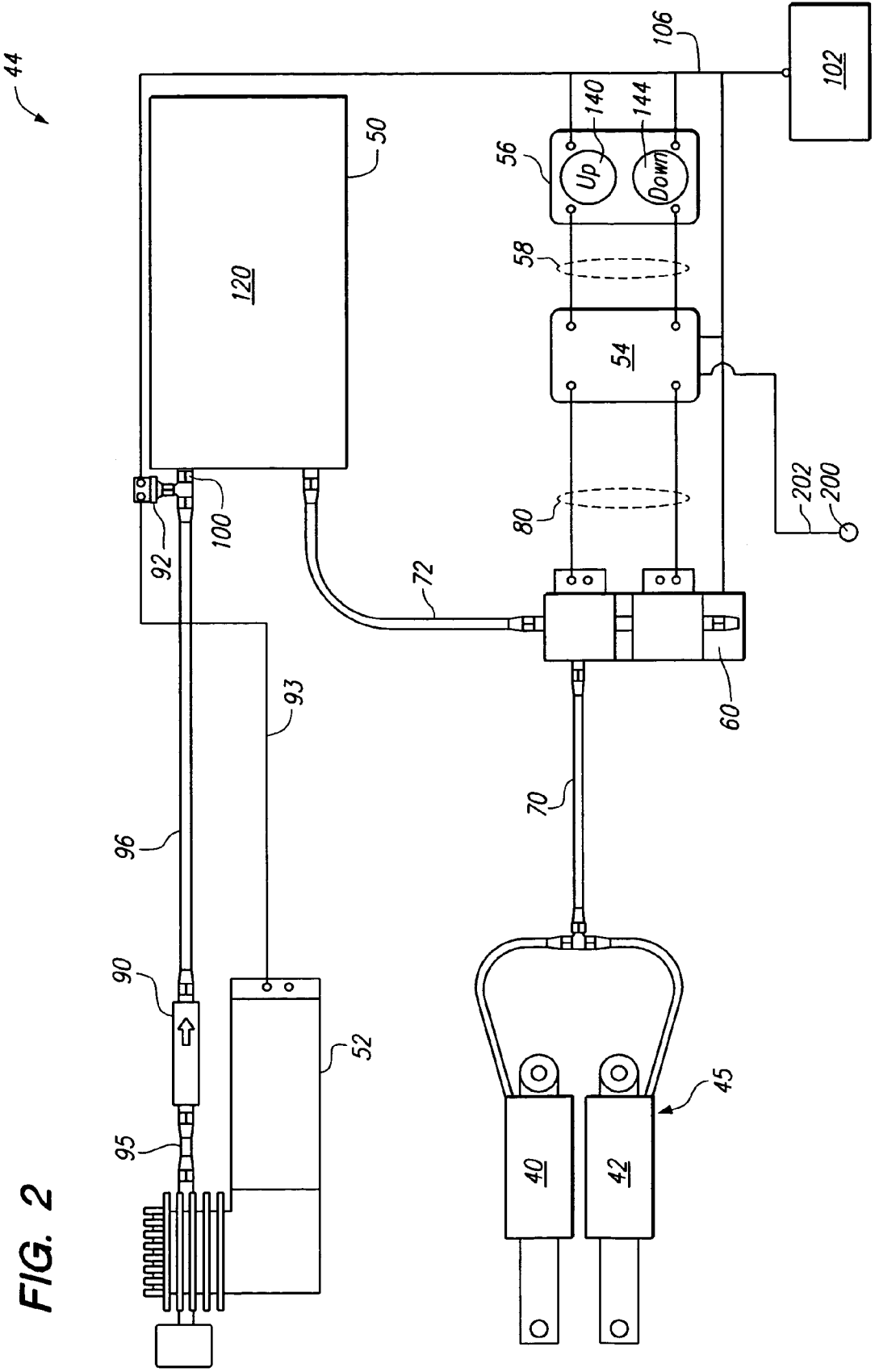
FIG. 2 is a schematic diagram of the preferred embodiment of the inventions which is shown in FIG. 1.

Referring now to FIG. 2, there is shown a schematic diagram of the height adjustment and load carrying capacity adjustment portion 44 of the preferred embodiment of the inventions in combination with the pair of air shock absorbers 40, 42 which cooperatively form an air shock absorber assembly 45.

As shown, the height adjustment and load carrying capacity adjustment portion 44 includes a generally hollow air tank 50, an air compressor 52, and a controller 54 which is operable under stored program control. In one non-limiting embodiment, controller 54 may be based upon a Pentium® type of chip. The height adjustment and load carrying capacity adjustment portion 44 further includes a handlebar or control switch assembly 56 which is physically and controllably coupled to the controller 54 by the bus 58 (e.g., the controller 54 and the switch 56 cooperatively form the control portion 22). Further, the height adjustment and load carrying capacity adjustment portion 44 includes a solenoid assembly 60 which may be formed by the cooperative combination of two or more solenoids and which is physically and communicatively coupled to the air shock absorber assembly 45 by the use of conduit 70 and to the air tank by the use of conduit 72. The solenoid assembly 60 is physically and controllably coupled to the controller 54 by the use of bus 80 and nothing in this description is meant to restrict the various inventions to a particular type of solenoid assembly. Further, the height adjustment and load carrying capacity adjustment portion 44 includes a one way valve 90 and a pressure switch 92. Particularly, in this non-limiting embodiment of the inventions, the one way valve 90 is physically, communicatively, and operatively coupled to the air compressor 52 by the conduit 95 and is also physically, communicatively, and operatively coupled to the pressure switch 92 by the conduit 96. Further, the pressure switch 92 is physically, operatively and communicatively coupled to air tank 50 by the conduit 100. Further, it should be appreciated that the height adjustment and load carrying capacity adjustment portion 44 (e.g., the controller 54) is adapted to be operatively coupled to a battery or other power source 102 (e.g., such as that which is normally provided upon/within the motorized vehicle 10) by bus 106. The pressure switch 92 is physically and communicatively coupled to the compressor 52 by the use of bus 93. Particularly, the battery or power source 102 is physically, communicatively and operatively coupled to the switch assembly 56, to the controller 54, to the solenoid assembly 60, to the compressor 52, and to the pressure switch 92, by the use of bus 106. It should be appreciated that pressure switch 92 may be alternatively and operatively coupled to conduit 72.

In operation, when the air tank 50 is empty (or reaches some predetermined level), the compressor 52 automatically (e.g., without user intervention and in response to a signal generated by the pressure switch 92 and placed onto bus 93) begins to generate air. The generated air is communicated to the hollow interior cavity 120 of the air tank 50 through the conduits 95, 96, and 100 and through the one way valve 90. After a certain predetermined period of time (e.g., after the generally hollow interior cavity 120 of the air tank 50 is substantially filled), a certain pressure is sensed by the pressure switch 92 and, upon sensing this pressure (e.g., the pressure generated by the contained air within the air tank 50), another signal is sent on the bus 93 which causes the air compressor 52 to be deactivated (i.e., to stop producing or generating air). When this pressure is reduced from the pressure which denotes a substantially full cavity 120, then yet another signal is sent on the bus 93, from the pressure switch 92, which causes the air compressor 52 to again generate air, thereby allowing such generated air to be communicated into the cavity 120 of the tank 50. In this manner, it should be appreciated that the tank 50 is automatically kept substantially full of air and is "automatically" deactivated or shut off to prevent unwanted noise and damage to the air compressor 52.

When it is desired to raise the height of the motorized vehicle 10, the operator 11, by use of a hand such as hand 18, electively depresses portion 140 of the switch 56 and, upon such depression, a signal is sent from the switch assembly 56 to the controller 54 which causes the controller 54 to activate the solenoid assembly 60, effective to cause the solenoid assembly 60 to allow air to flow or be communicated from the air tank 50 to the air shock assembly 45 through the conduits 70, 72. In one non-limiting embodiment of the invention, such air flows into the air shock assembly 45 until the air shocks can receive no more air. Alternatively, such air flows only until the operator 11 ceases to depress the switch portion 140 or until the air shock assembly 45 is actually made substantially full. In this manner, the height of the motorized assembly 10 is raised (i.e., the motorized assembly 10 is selectively moved away from the ground 150) and the load carrying capacity of the motorized assembly 10 is selectively increased (e.g., the filled air shock assembly 45 allows the motorized assembly 10 to carry more weight). By selectively modifying the signal to solenoid assembly 60, one may cause the height increase to occur slowly or at any desired speed.

Alternatively, when it is desired to selectively lower the height and load carrying capacity of the motorized assembly 10, the user 11 selectively depresses portion 144 of the switch assembly 56 (e.g., by hand 18). Upon a selective depression of portion 144, a signal is generated by the switch assembly 56 and communicated to the controller 54, by the use of bus 58. Upon receipt of this generated signal, the controller 54 causes a signal to be generated to the solenoid assembly 60 which is effective to cause air to be vented from the air shock assembly 45 (e.g., communicated from the air shock assembly 45 to the ambient environment or to the tank 50 through the conduits 70 and 72, or to any other assembly or manner). By selectively modifying the signal to solenoid assembly 60, one may cause the height decrease to occur slowly or at any other desired speed. In one non-limiting embodiment, a single depression of the switch portion 144 causes substantially all of the air contained within the air shock assembly 45 to be vented. Alternatively, such venting occurs only while the switch portion 144 continues to be depressed, or until "full venting" has occurred.

It should be appreciated that the placement of the control switch assembly 56 upon the handlebar portion 21 allows the operator 11 to control the height and load carrying capacity of the motorized assembly 10 without requiring the operator 11 to take his hands (e.g., hand 18) off of the handlebar portion 21 and that this configuration promotes and increases the safety of the overall operation. That is, if it was required for the operator 11 to remove at least one hand from the handlebar portion 21, then it is possible that such a distraction and a loss of full control over portion 21 might cause the operator 11 to lose operational control over the motorized assembly 10. Further, it should be appreciated that by having the tank 50 to be substantially full at all times, (e.g., operating as an "air buffer"), in the foregoing manner, allows the overall height of the motorized assembly 10 and the load carrying capacity of the motorized assembly 10 to be respectively and quickly raised and increased (e.g., within two seconds), and that the foregoing venting may also quickly occur (e.g., within about one second).

Further, in yet another non-limiting embodiment of the invention, the height adjustment and load carrying capacity portion 44 includes a speed sensor 200 which is physically and communicatively coupled to the controller 54 by the bus 202 and which is adapted to sense the operating speed of the engine or power generation assembly 20. Alternatively, the speed sensor 200 may be adapted to sense the speed of the wheels 12, 14. In this non-limiting embodiment, the sensed speed is communicated to the controller 54, by the use of bus 202 and, should the sensed speed lie above some maximum threshold value (e.g., about 40 miles per hour), then any command signals received from the switch assembly 56 are ignored by the controller 54 in order to ensure that a height adjustment and load carrying adjustment is not accomplished while the motorized assembly 10 is operating at what may be considered to be an unsafe speed for such a modification to occur (e.g., a height and load carrying adjustment accomplished at a high rate of speed may cause the motorized assembly 10 to become unstable). In yet another non-limiting embodiment of the invention, this maximum speed threshold value may be programmable by the user 11.

It should be further appreciated that in yet another non-limiting embodiment of the invention, the height adjustment and load carrying capacity portion 44 may comprise a "kit" (e.g., a collection of elements) for aftermarket use, or may comprise a portion of an originally produced motorized assembly 10. Further, it should be appreciated that the motorized assembly 10 is relatively compact and easily installable and, in fact in one non-limiting embodiment of the invention, may be substantially mounted in a substantially co-planar manner to the energy producing assembly 10 and substantially hidden from view.

It should be realized that the inventions are not limited to their respective and exact constructions which have been illustrated and described above, but that various changes and modifications may be made without departing from the spirit and the scope of these inventions as are further delineated in the following claims.

What is claimed is:

1. A method of selectively raising a height of a motorized assembly comprising the steps of providing an air buffer; substantially filling said air buffer with air; using said air from said air buffer of said motorized assembly to selectively and discretionarily adjust the height of said motorized assembly; monitoring a speed of said motorized assembly; and allowing said air to be used to raise said height of said motorized assembly only if said monitored speed is below a certain maximum threshold value.

2. The method of claim 1 wherein said motorized assembly comprises a motorcycle.

3. The method of claim 1 wherein said motorized assembly includes a handlebar portion, said method further comprising the steps of causing said air to be used to raise said height by use of an assembly which is mounted upon said handlebar portion.

4. The method of claim 3 wherein said buffer comprises an air tank.

5. The method of claim 1 further comprising allowing said air to be used to lower said height of said motorized assembly only if said monitored speed is below a certain maximum threshold value.

6. The method of claim 1 wherein said motorized assembly includes a handlebar portion, said method further comprising the steps of causing said air to be used to lower said height by use of an assembly which is mounted upon said handlebar portion.

* * * * *